(12) United States Patent
Schmitz et al.

(10) Patent No.: US 8,442,697 B2
(45) Date of Patent: May 14, 2013

(54) METHOD AND APPARATUS FOR ON-DEMAND POWER MANAGEMENT

(75) Inventors: Michael J. Schmitz, Fargo, ND (US);
Brian M. Morlock, Fargo, ND (US);
Joel A. Jorgenson, Fargo, ND (US)

(73) Assignee: Packet Digital, Fargo, ND (US)

( * ) Notice: Subject to any disclaimer, the term of this patent is extended or adjusted under 35 U.S.C. 154(b) by 1296 days.

(21) Appl. No.: 12/079,682

(22) Filed: Mar. 28, 2008

(65) Prior Publication Data

US 2009/0158061 A1 Jun. 18, 2009

Related U.S. Application Data

(60) Provisional application No. 61/014,650, filed on Dec. 18, 2007.

(51) Int. Cl.
*G06F 19/00* (2011.01)

(52) U.S. Cl.
USPC ............ 700/295; 700/297; 713/300; 713/322

(58) Field of Classification Search .......... 700/295–298; 713/300, 322; 345/212, 426
See application file for complete search history.

(56) References Cited

U.S. PATENT DOCUMENTS

| | | | | |
|---|---|---|---|---|
| 5,167,024 A | * | 11/1992 | Smith et al. | 713/322 |
| 5,664,205 A | * | 9/1997 | O'Brien et al. | 713/322 |
| 6,167,330 A | * | 12/2000 | Linderman | 700/295 |
| 6,345,362 B1 | * | 2/2002 | Bertin et al. | 713/300 |
| 6,625,740 B1 | * | 9/2003 | Datar et al. | 713/324 |
| 7,363,176 B2 | * | 4/2008 | Patel et al. | 702/64 |
| 2006/0250843 A1 | * | 11/2006 | Bertin et al. | 365/185.08 |
| 2010/0218019 A1 | * | 8/2010 | Eckhard | 713/322 |
| 2010/0295852 A1 | * | 11/2010 | Yang et al. | 345/426 |

OTHER PUBLICATIONS

Richard F. Zarr, "Powerwise Solutions and the Future of Energy Utilization." National Semiconductor. Sep. 2007, 3 pages.
Sandy Irani, et al, "Online Strategies for Dynamic Power Management in Systems with Multiple Power-Saving States." University of California at Irvine. ACM Transactions on Embedded Computing Systems, vol. 2, No. 3, Aug. 2003 . pp. 325-346.

\* cited by examiner

*Primary Examiner* — Jeffrey A Gaffin
*Assistant Examiner* — Douglas Lee
(74) *Attorney, Agent, or Firm* — Lowenstein Sandler LLP (57) ABSTRACT

Embodiments of a method and an apparatus for on-demand power management of a processing system have been presented. In some embodiments, the apparatus includes a power management unit (PMU) to provide power to an electronic system. The apparatus further includes a power management controller (PMC) coupled to the power management unit, to control values of one or more parameters of an operating state of the PMU in response to the operating conditions of the electronic system. The PMC may execute a power management algorithm (PMA) to determine the values of the parameters. Further, the PMU and the PMC may reside on different integrated circuit substrates.

19 Claims, 8 Drawing Sheets

METHOD AND APPARATUS FOR ON-DEMAND POWER MANAGEMENT

REFERENCE TO RELATED APPLICATION

This application claims the benefit of U.S. Provisional Patent Application No. 61/014,650, filed on Dec. 18, 2007.

TECHNICAL FIELD

The present invention relates generally to power management, and in particular to managing voltages and frequencies in response to application processing demands.

BACKGROUND

As digital electronic processing systems trend toward higher operating frequencies and smaller device geometries, power management has become increasingly important to prevent thermal overload while maintaining system performance and prolonging battery life in portable systems.

The two principal sources of power dissipation in digital logic circuits are static power dissipation and dynamic power dissipation. Static power dissipation is dependent on temperature, device technology and processing variables, and is composed primarily of leakage currents. Dynamic power dissipation is the predominant loss factor in digital circuitry and is proportional to the operating clock frequency, the square of the operating voltage and the capacitive load. Capacitive load is highly dependent on device technology and processing variables, so most approaches to dynamic power management focus on frequency and voltage control.

One conventional approach to power management halts the processing system to adjust core clock frequencies and voltages, during which time the processor does not execute operating system code or application code, and then restarts the system after the new frequencies and voltages have stabilized.

Another conventional approach to power management changes the clock frequency of a processor while the processor is operating, but requires the frequency changes to be made in small increments to avoid processing errors that large frequency steps would cause. As a result, this approach may require a significant time period to achieve a desired operating frequency.

Yet another conventional approach to power management employs a fixed relationship between voltage and frequency, either through a lookup table or by use of a frequency to voltage converter. In this approach, a frequency increase is always preceded by a voltage increase and a frequency decrease always precedes a voltage decrease. In addition, a frequency increase is delayed while the voltage is ramped up to a corresponding voltage. The new frequency and voltage are not scaled independently, and the new operating point may not be optimum with respect to an application's processing demand.

In some conventional data processing systems, processors within the systems execute software at the operating system (OS) level to perform power management. The processor core of a typical data processing system has a fixed external frequency reference that is multiplied up internally to a higher frequency. The processor may adjust the internal switching frequency of the processor core by either adjusting a phase locked loop (PLL) multiplication factor, adjusting an internal clock divider, or a combination thereof. The processor may estimate a preferred switching frequency by monitoring the current tasks and the pending task deadlines. However, the processor has to devote some processing overhead to execute the software. As such, this approach is an inefficient way to extract the maximum amount of power savings. In addition, the software is executed in a non-realtime OS, and thus, may add more latency and reduce the amount of power savings.

Furthermore, some conventional processors execute software to make all decisions on how and when to adjust the voltages and clocks in the system. In many cases, the software executed by the conventional processors involves mathematical routines (e.g., division, integration, minimization, etc.). It is generally difficult to implement these routines on hardware because of the large gate count and high power requirement.

Because the majority of processors do not incorporate internal adjustable voltage regulators to optimize the core voltage, it is more difficult to implement dynamic voltage scaling (DVS) of the processor core than dynamic clock scaling. Therefore, many conventional designs that incorporate dynamic frequency scaling (DFS) adopt a fixed "worst-case" core voltage, instead of implementing DVS. However, in designs that do incorporate DVS at the processor level, the typical approach is to interface a power management unit (PMU) to the processor using a master/slave serial bus. With this configuration, the processor acting as the master communicates the desired core voltage data to the PMU whenever the processor has to adjust the core voltage. The serial nature of this approach may cause undesirable latency in DVS, and in turn, may add undesirable latency to DFS. This latency in DVS and DFS reduces power savings by delaying the transition of the processor core to a lower power mode and decreases processor performance by delaying the transition of the processor core to a higher power mode when demanded by the pending tasks.

One common conventional approach to implement DVS is to use a look-up table in software on the processor. For every clock frequency that may be used in DFS, a minimum "worst-case" core voltage is calculated. Therefore, whenever the DFS software in the processor calculates a new operating frequency, the respective core voltage is retrieved from the look-up table and communicated to the external PMU as necessary through software. This approach may generally be implemented on processors with internal clock scaling circuitry.

Another conventional approach to implement DVS is to incorporate a specialized hardware block on the processor that is capable of determining the preferred core voltage. This approach has an advantage over the look-up table approach because additional parameters can be considered, such as process, temperature, well biasing, etc. However, one major disadvantage in this approach is that it is processor dependent, and thus, may only be implemented on a small subset of available processors. Furthermore, this approach does little to address the latency issue because the processor still uses a serial bus to communicate voltage changes to the PMU.

BRIEF DESCRIPTION OF THE DRAWINGS

The present invention is illustrated by way of example, and not of limitation, in the figures of the accompanying drawings in which.

DETAILED DESCRIPTION

In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention. It should be noted that the "line" or "lines" discussed herein, that connect elements, may be single lines or multiple lines. It will also be understood by one having ordinary skill in the art that lines and/or other coupling elements may be identified by the nature of the signals they carry (e.g., a "clock line" may implicitly carry a "clock signal") and that input and output ports may be identified by the nature of the signals they receive or transmit (e.g., "clock input" may implicitly receive a "clock signal").

In some embodiments, a power manager includes one or more power management units (PMUs) and a power management controller (PMC). The PMUs provide power to an electronic system, such as a data processing system. The PMC, coupled to the PMUs, controls values of one or more parameters of an operating state of each of the PMUs in response to the operating conditions of the electronic system. The PMC may execute a power management algorithm (PMA) to determine the values of the parameters. Further, the PMUs and the PMC may reside on different integrated circuit (IC) substrates. For instance, one of the PMUs and the PMC may be in different semiconductor chips. More details of various embodiments of the power manager are discussed below.

Figure 1A:
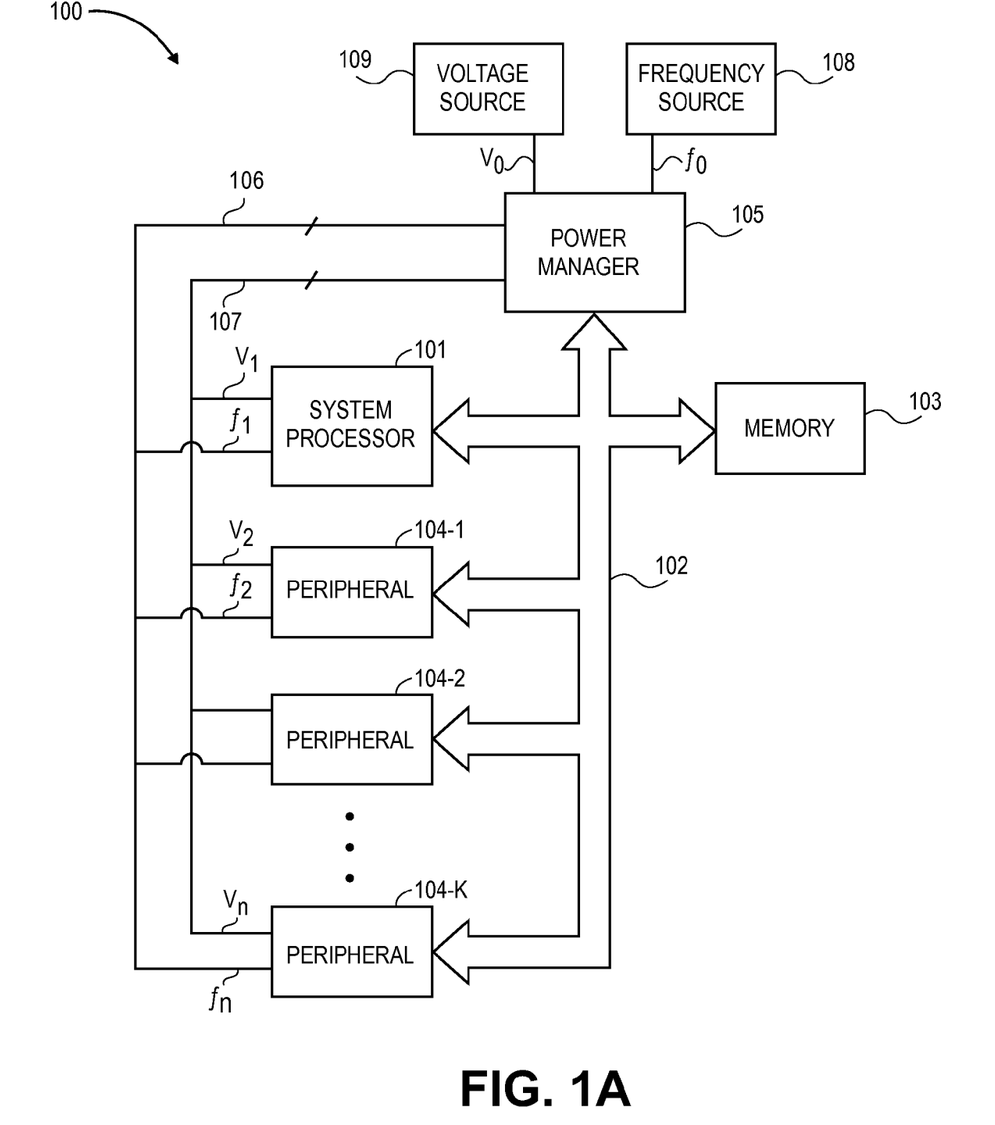
FIG. 1A illustrates one embodiment of an on-demand power manager in a processing system.

FIG. 1A illustrates one embodiment of on-demand power manager 105 in a processing system 100. Processing system 100 may include a system processor 101, which may be a general-purpose processing device such as a microprocessor or central processing unit, or the like. Alternatively, system processor 101 may also be a special-purpose processing device such as an application specific integrated circuit (ASIC), a field programmable gate array (FPGA), a digital signal processor (DSP) or the like. System processor 101 may also be any combination of a general-purpose processing device and a special-purpose processing device. System processor 101 may be coupled to a system bus 102 which may carry system data and commands to and from system processor 101. System bus 102 may be coupled to memory 103 which may store programs and data. Memory 103 may be any type of memory, including, but not limited to, random access memory (RAM) and read only memory (ROM). System bus 102 may also be coupled with peripherals 104-1 through 104-$k$ to carry system commands and data to and from peripherals 104-1 through 104-$k$.

Processing system 100 may also include power manager 105, which may be coupled to system bus 102, frequency source 108 and voltage source 109. Power manager 105 may also be coupled to system processor 101 and peripherals 104-1 through 104-$k$ via a clock bus 106 and voltage bus 107. In one embodiment, power manager 105 may be coupled to an external frequency source 108. Power manager 105 may be capable of converting a reference frequency $f_0$ from frequency source 108 into one or more clock frequencies $f_1$ through $f_m$, phase-locked to reference frequency $f_0$, to provide clock signals to system processor 101 and peripherals 104-1 through 104-$k$. In other embodiments, frequency source 108 may be integrated with power manager 105 and reside with power manager 105 on a common carrier substrate such as, for example, an integrated circuit (IC) die substrate, a multi-chip module substrate, or the like. Power manager 105 may also be capable of converting a voltage $V_0$ from voltage source 109 into one or more operating voltages $V_1$ through $V_n$ to provide voltages to system processor 101 and peripherals 104-1 through 104-$k$. In the embodiment illustrated in FIG. 1A, each of system processor 101 and peripherals 104-1 through 104-$k$ are shown to have one voltage input and one clock input such that m=n=k+1. It will be appreciated that in other embodiments, any of system processor 101 and peripherals 104-1 through 104-$k$ may require more than one operating voltage and/or more than one clock signal. In one embodiment, two or more of system processor 101, memory 103, power manager 105, frequency source 108 and peripherals 104-1 through 104-$k$ may reside on a common carrier substrate, for example, a printed circuit board (PCB) such as motherboard 110 illustrated in FIG. 1B, a daughter board 111 in FIG. 1B, or a line card. Alternatively, the common carrier substrate on which the two or more of system processor 101, memory 103, power manager 105, frequency source 108 and peripherals 104-1 through 104-$k$ may reside on one or more IC die substrates.

Figure 1B:
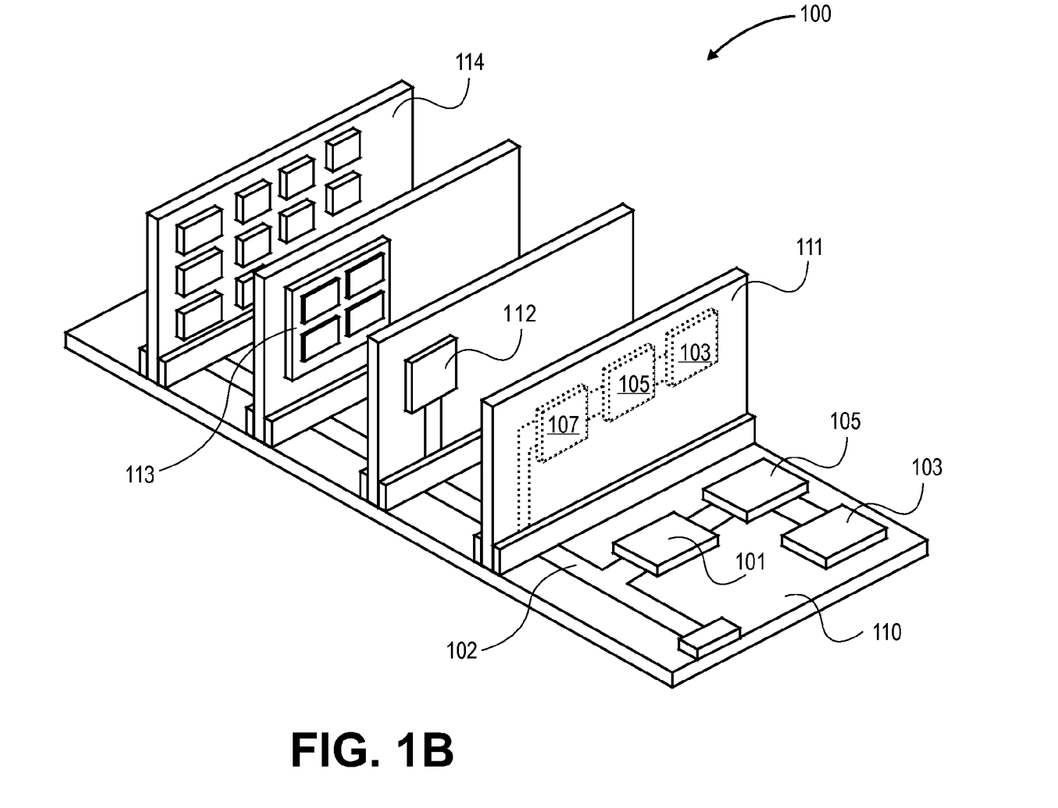
FIG. 1B illustrates one embodiment of on-demand power management in a distributed processing system.

With reference to FIG. 1B, peripherals 104-1 through 104-$k$ may be any type of device, component, circuit, sub-system or system capable of communicating with system processor 101 via system bus 102. For example, any of peripheral devices 104-1 through 104-$k$ may be a single chip device 112 such as a system on a chip, an ASIC, an FPGA, a memory chip or like device. Any of peripherals 104-1 through 104-$k$ may also be a multi-chip module 113 including any combination of single chip devices on a common IC substrate. Alternatively, peripherals 104-1 through 104-$k$ may reside on one or more printed circuit boards such as, for example, a mother board 110, a daughter board 114 or other type of circuit card.

Figure 2:
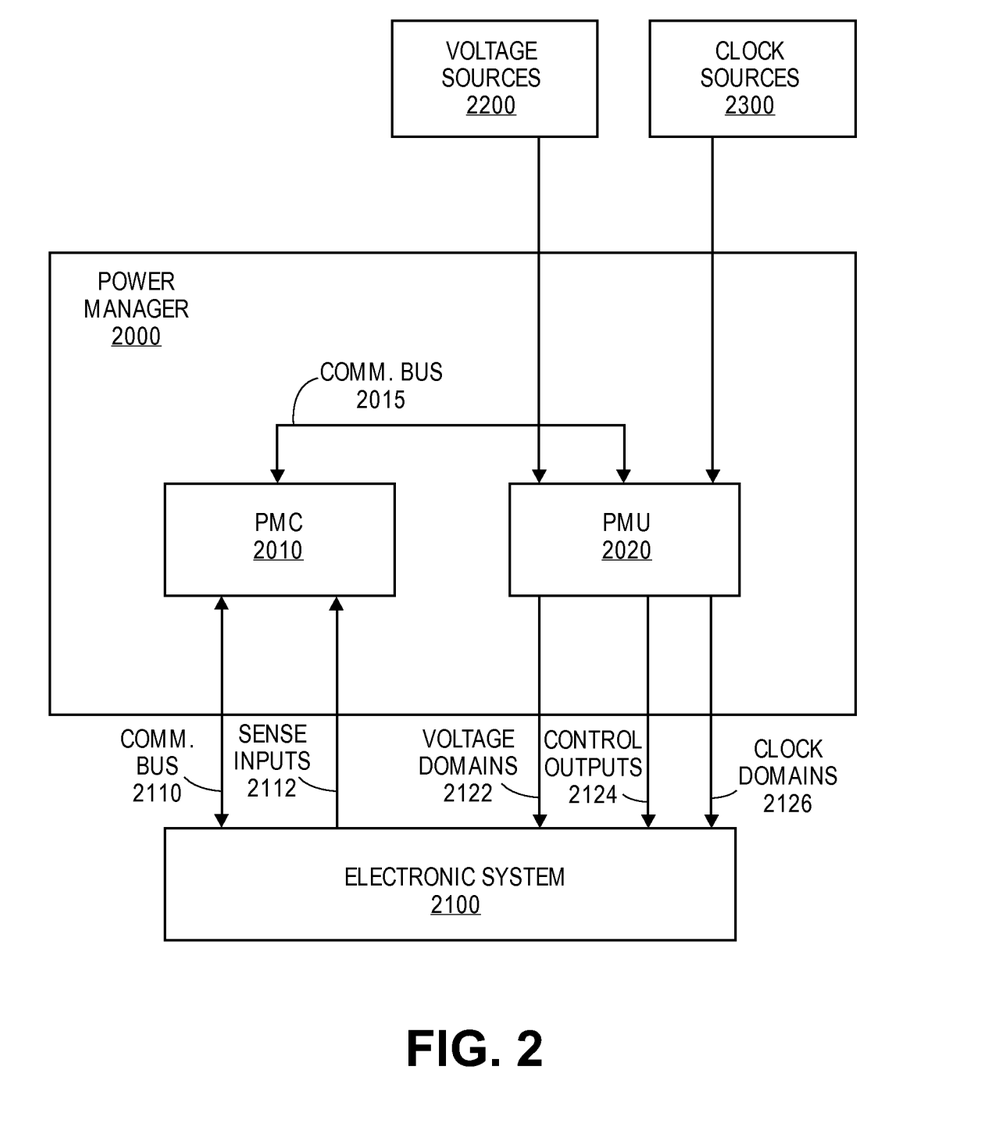
FIG. 2 illustrates one embodiment of an on-demand power manager.

FIG. 2 illustrates one embodiment of an on-demand power manager. The power manager 2000 includes a power management controller (PMC) 2010 and a power management unit (PMU) 2020, coupled to each other via a communication bus 2015. The PMC 2010 and the PMU 2020 may reside on different IC substrates, or on the same IC substrate. Alternatively, the power manager 2000 may include a PMC and multiple PMUs, where some or all of the PMC and the PMUs reside on different IC substrates. The power manager 2000 is coupled between voltages sources 2200, clock sources 2300, and an electronic system 2100 (such as the processing system 100 in FIG. 1A).

In some embodiments, the PMU 2020 provides power to the electronic system 2100, whereas the PMC 2010 controls the operating states of the PMU 2020 in response to operating conditions of the electronic system 2100. Using sense inputs signals 2112 and/or a communication bus 2110, the PMC 2010 may monitor the operating conditions of the electronic system 2100. Some examples of the electronic system 2100 include a portable electronic system, such as a radio, a smart phone, a camera, a sensor, etc., or other non-portable electronic system, such as a desktop computer, a server, etc. Based on the operating conditions of the electronic system 2100, the PMC 2010 may autonomously execute a power management algorithm (PMA) to determine the corresponding operating states of the PMU 2020. An operating state of the PMU 2020 may include parameters related to the voltage, frequency, and/or control outputs of the PMU 2020. The PMC 2010 may then control the voltage, clock, and control outputs of the PMU 2020 by sending signals to the PMU 2020 via the communication bus 2015.

In one embodiment, the sense inputs 2112 may be analog signals, digital signals, or mixed signals. Further, the state of the sense inputs 2112 may be correlated to operating conditions or activities in the electronic system 2100. For example, the sense inputs 2115 may be used to monitor chip selects, enable signals, or communication buses of peripherals (e.g., peripherals 104-1-104-k in FIG. 1A) in the electronic system 2100. Alternatively, the sense inputs 2115 may be used to monitor the processing load of a processor (e.g., system processor 101 in FIG. 1A) in the electronic system 2100. Alternatively, the sense inputs 2115 may be used to monitor the temperatures, voltages, and/or currents in the electronic system 2100.

In some embodiments, the PMC 2010 executes a power management algorithm (PMA) to determine the correct operating states of voltages, frequencies, and control signals in the electronic system 2100. The PMA executed in the PMC 2010 may use the sense inputs signals 2112 from the electronic system 2100 to determine the optimal operating states of the PMU 2020. Likewise, the communication bus 2110 interfacing the PMC 2010 to the electronic system 2100 may allow the electronic system 2100 to adjust programmable parameters of the PMC 2010 and/or determine optimal operating states of the PMU 2020.

Referring to FIG. 2, the PMC 2010 communicates the operating state of the PMU 2020 to the PMU 2020 over the communication bus 2015. The communication bus 2015 may be the same communication bus that interfaces the PMC 2010 to the electronic system 2100. In some alternative embodiments, the PMC 2010 may be interfaced to and control one or more PMUs using the same or separate communication buses.

The voltage domain outputs 2122, clock domains output 2126, and control outputs 2124 of the PMU 2020 are adjusted by the PMU 2020 to correlate with the operating states received by the PMU 2020 from the PMC 2010. The voltage domain outputs 2122 may be used to supply voltage to one or more voltage domains in the electronic system 2100. The clock domains output 2126 may be used to supply a clock to one or more clock domains in the electronic system 2100. The voltage domains outputs 2122 and clock domains output 2126 of the PMU 2020 may be derived from voltage sources 2200 and clock sources 2300 coupled to the PMU 2020, respectively. The control outputs 2124 of the PMU 2020 may be used to control the operating states of sub-systems and/or peripherals in the electronic system 2100. For instance, one of the control outputs 2124 may be a digital signal used to enable and/or disable peripherals in the electronic system 2100.

Figure 3A:
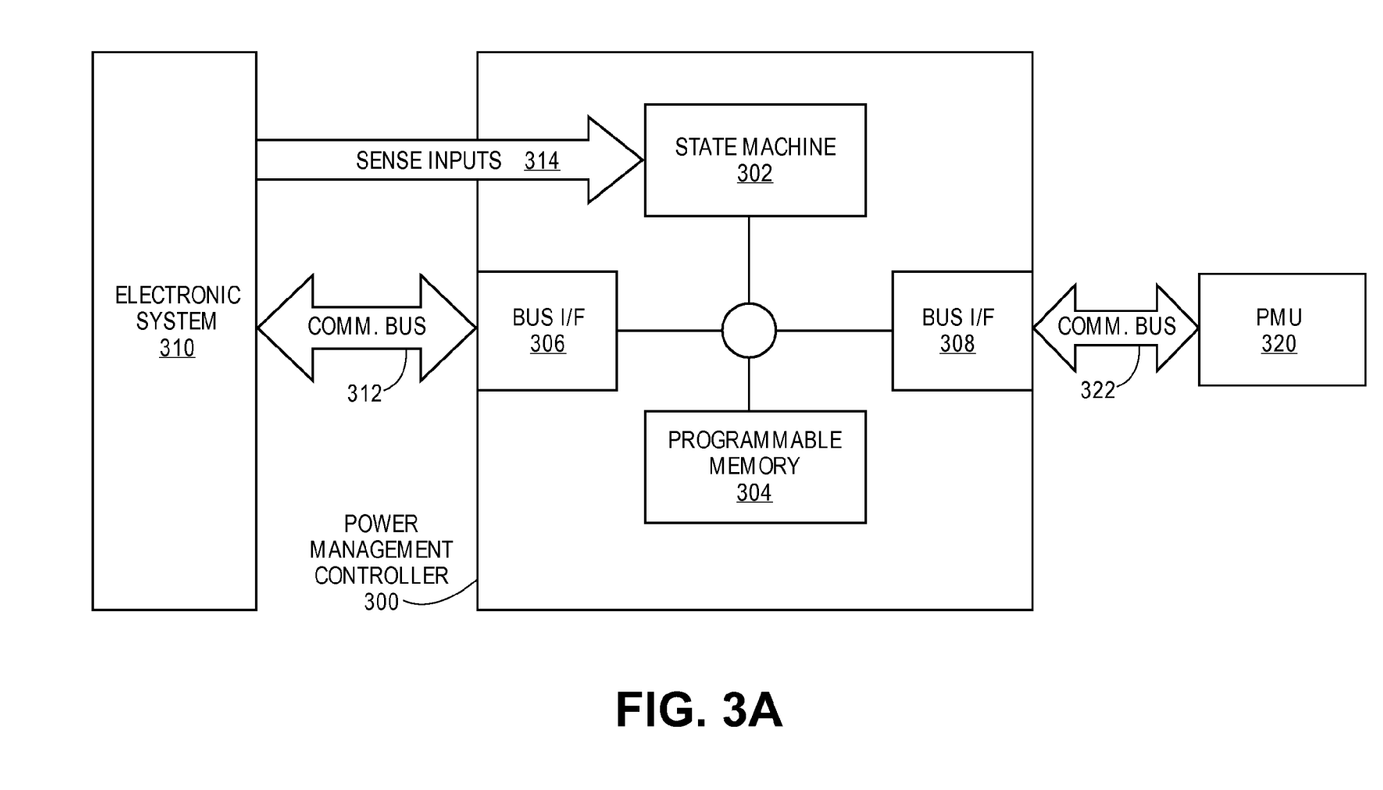
FIG. 3A illustrates one embodiment of an on-demand power management controller.

FIG. 3A illustrates one embodiment of an on-demand PMC. The PMC 300 is coupled between an electronic system 310 and a PMU 320. The PMC 300 includes a state machine 302, a programmable memory 304, and two bus interfaces 306 and 308, which are operatively coupled to each other. In some embodiments, a PMA is implemented using hardware, such as the state machine 302. The state machine 302 receives sense inputs signals 314 from the electronic system 310 to monitor activity in the electronic system 310.

In some embodiments, the programmable memory 304 stores operating parameters. The programmable memory 304 may include non-volatile memory (e.g., flash memory, etc.), volatile memory (e.g., dynamic random access memory (DRAM), etc.), or both. Non-volatile memory may store default operating parameters for the PMC 300 after power up of the PMC 300. In addition, the non-volatile memory may store initial operating states for the PMU 320 after power up of the PMU 320. The use of programmable non-volatile memory in the PMC 300 allows the PMU 320 to generate programmable default voltage, clock, and control outputs after power up of the PMU 320 and/or the PMC 300 independent of the sense inputs signals 314 and signals on the communication bus 312 from the electronic system 310. Furthermore, the use of programmable non-volatile memory in the PMC 300 allows the PMC 300, the electronic system 310, and/or the PMU 320 to update programmable settings and/or values in the PMC 300 during runtime of the PMC 300. As such, the PMC 300 may accept and store operating parameters that may change after power up of the electronic system 310, the PMC 300, and/or the PMU 320.

The bus interfaces 306 and 308 communicate with the electronic system 310 and the PMU 320, respectively. Specifically, the bus interface 308 communicates with the PMU 320 over the communication bus 322. This allows the PMC 300 to control the operating states of the PMU 320. The communication bus 322 may include a serial bus or a parallel bus. The communication bus 322 may reside only on a single IC substrate that includes both the PMC 300 and the PMU 320. Alternatively, the communication bus 322 may communicatively couple two different IC substrates on which the PMC 300 and the PMU 320 reside.

In some embodiments, the bus interface 306 communicatively couple the PMC 300 with the electronic system 310 via the communication bus 312. This allows the electronic system 310 to control the operating parameters of the PMC 300, the operating states of the PMU 320, etc. The communication bus 312 may include a serial bus or a parallel bus.

The PMA that is implemented by the state machine 302 determines the operating states of the PMU 320 dynamically based on the operating conditions in the electronic system 310. The operating conditions in the electronic system 310 may be monitored through the sense inputs signals 314 and/or signals on the communication bus 312.

Each power domain controlled by the PMU 320 through voltage, clock, and/or control output changes may have multiple operating states, including active states and standby states. Furthermore, each power domain may have more than one active states, such as a fast state, a slow state, or other types of active states. In addition, each power domain may have more than one standby states, including an idle state, a power-down state, or other types of standby states.

Depending on conditions monitored in the electronic system 310 by the PMC 300, the PMA implemented by the state machine 302 may select from active or standby operating states for each power domain in the electronic system 310. For each power domain, the PMA may select from one active state and one standby state, one active state and multiple standby states, multiple active states and one standby state, multiple active and multiple standby states, or multiple active states.

One example of the PMA that may be implemented by the state machine 302 is Lower Envelope Algorithm (LEA). For a given power domain controlled by the PMU 320, the LEA selects between one active state and one or more standby states depending on the sense inputs signals 314 from the electronic system 310 that indicate if the power domain under control has to be in the active state. If the power domain is not in the active state, the LEA may control the PMU 320 through the bus interface 308 in the PMC 300 to transition the power domain from a non-active state to the active state with little latency. As long as the sense inputs signals 314 to the PMC 300 identify that the power domain under control has to be in the active state and the power domain is currently in the active state, the LEA does not transition the power domain to a standby state.

When the sense input signals 314 no longer indicate that the power domain has to be in the active state, then the LEA may transition the power domain to a standby state after some predetermined criteria have been met. For instance, the criteria may include a time period of non-activity as determined using the sense input signals 314. The time delay to wait before transitioning from the active state to the standby state may be calculated based on the amount of power consumed while operating in the standby state, the amount of power consumed while transitioning from the standby state to the active state, and the time latency induced by transitioning from the standby state to the active state.

Furthermore, the LEA may transition the power domain from one standby state to another standby state based on another time period that may be calculated based on the power consumed while operating in the next standby state, the amount of power consumed while transitioning from the next standby state to the active state, and the time latency induced by transitioning from the next standby state to the active state. The length of these time periods may be stored in the programmable memory 304 in the PMC 300 and may be modified by the electronic system 310 via the communication bus 312. To further illustrate the concept, an exemplary embodiment of the LEA is described in details below.

Figure 4:
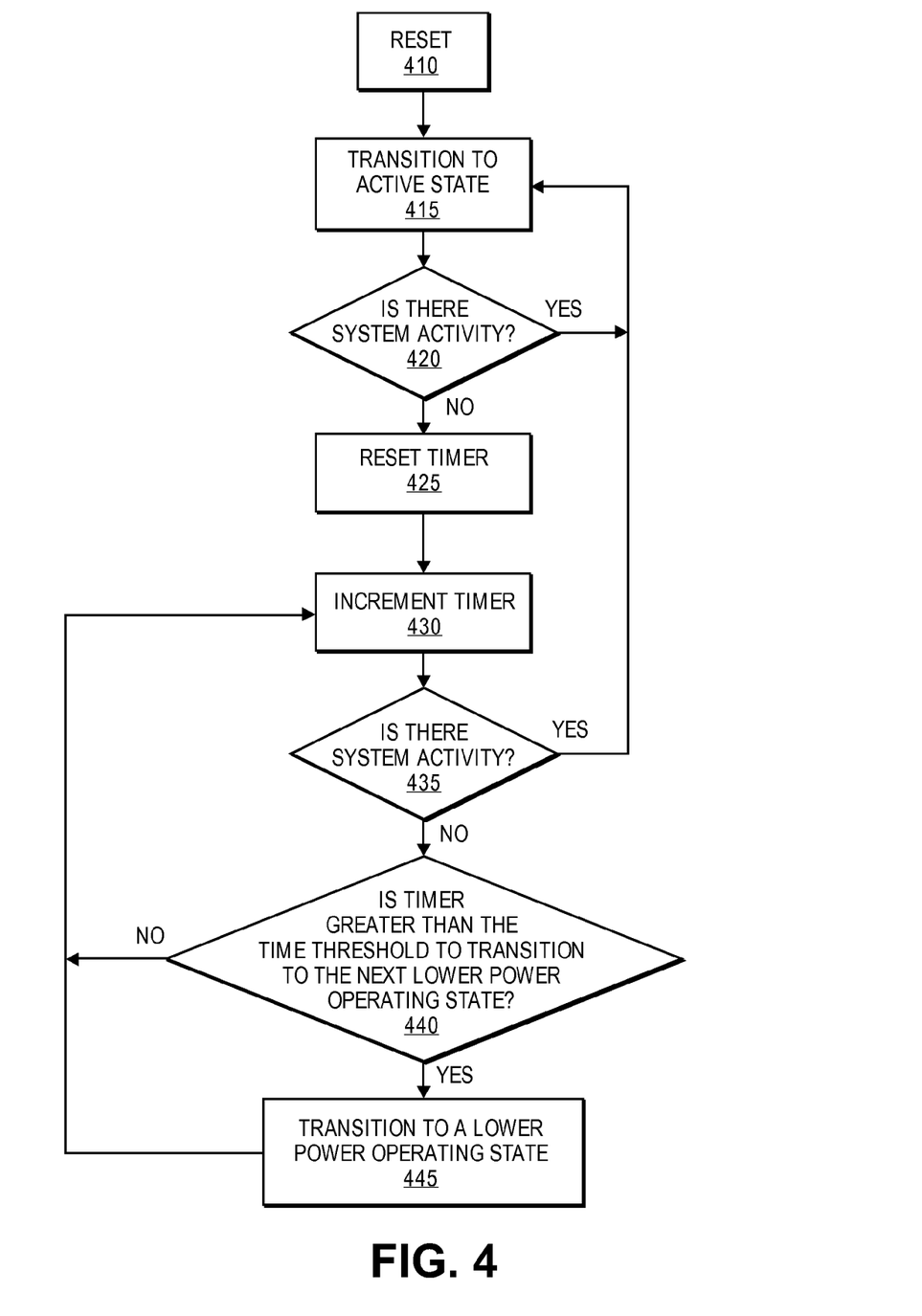
FIG. 4 illustrates one embodiment of a process to perform a power management algorithm.

FIG. 4 illustrates one exemplary embodiment of the LEA. At block 410, the electronic system, the PMC, and the PMU are reset. Then the LEA transitions to the active state at block 415. At block 420, the LEA determines if there is any system activity. If there is system activity, the LEA transitions back to block 415 to remain in the active state. Otherwise, the LEA transitions to block 425 to reset a timer. The LEA increments the timer at block 430. Then the LEA checks if there is any system activity again at block 435. If there is system activity, the LEA returns to block 415 to remain in the active state. Otherwise, the LEA checks if the value of the timer is greater than the time threshold to transition to the next lower power operating state (such as one of the standby states) at block 440. If the value of the timer is not greater than the time threshold, then the LEA returns to block 430 to increment the timer again. Otherwise, the LEA transitions to the next lower power operating state at block 445.

As discussed above, the PMA may be implemented using only hardware, such as the state machine 302 in the PMC 300 in FIG. 3A. Alternatively, the PMA may be implemented using machine code stored in a programmable memory and executed by a processor in the PMC. Such an embodiment is illustrated in FIG. 3B.

Figure 3B:
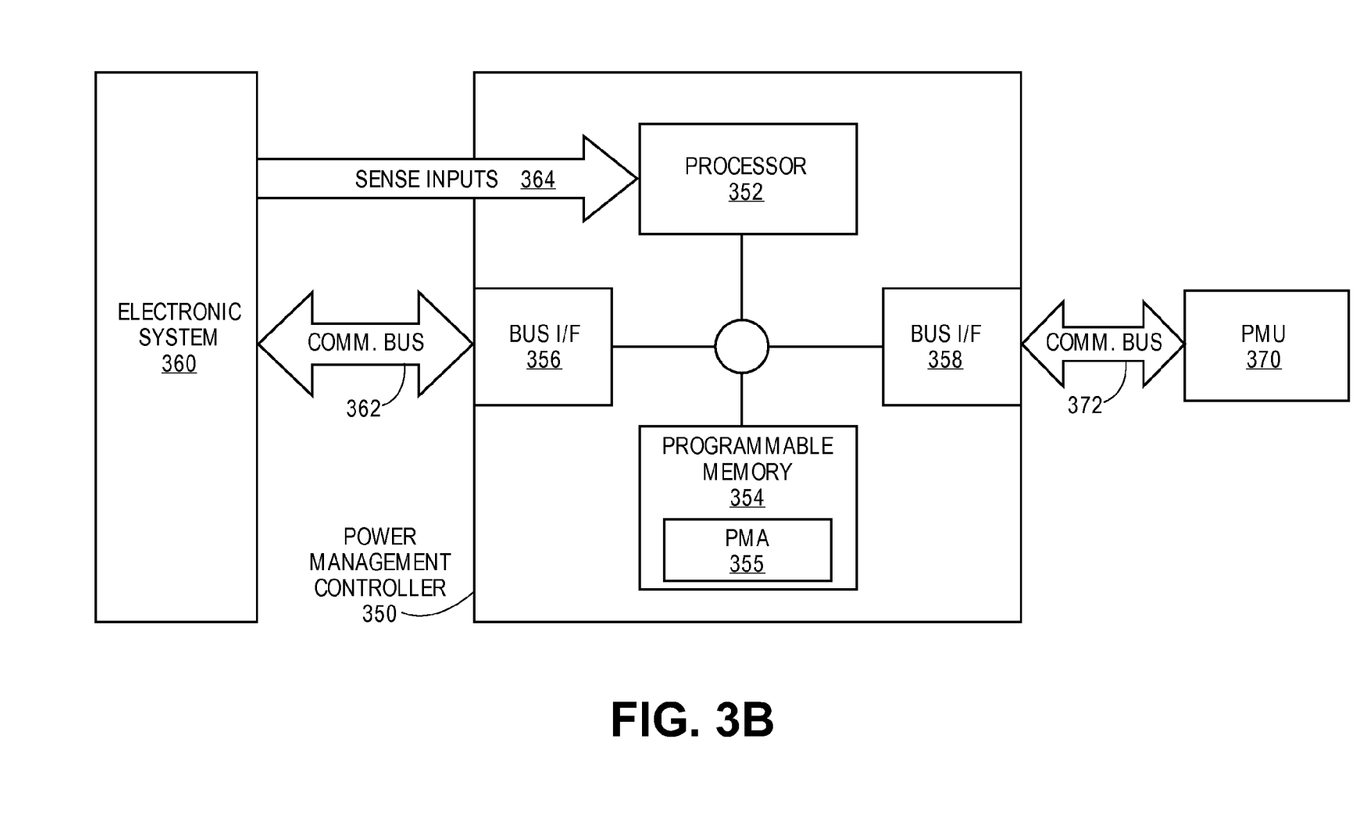
FIG. 3B illustrates an alternative embodiment of an on-demand power management controller.

FIG. 3B illustrates an alternate embodiment of an on-demand power management controller. The PMC 350 is coupled between an electronic system 360 and a PMU 370. The PMC 350 includes a processor 352, a programmable memory 354, and two bus interfaces 356 and 358, which are operatively coupled to each other. In some embodiments, a PMA 355 is encoded in machine code and stored in the programmable memory 354. The processor 352 receives sense inputs signals 364 from the electronic system 360 to monitor activity in the electronic system 360. Further, the processor 352 retrieves the PMA 355 from the programmable memory 354 and executes the PMA 355 in response to the sense inputs signals 364 and/or signals on the communication bus 362 to determine the operating state for the PMU 370.

In some embodiments, the processor 352 is a dedicated hardware controller separate from other system processor(s) that may exist in the PMC 350. For instance, the processor 352 may include one or more programmable logic devices (PLDs). While PLDs are suitable for executing the PMA, the general programmable nature of the platform may require more silicon area and more power consumption by the PMC 350. Alternatively, an application specific integrated circuit (ASIC) designed specifically for executing the PMA (or a set of PMAs) may be used instead to more fully exploit the benefit of the PMA. Such an implementation generally results in a PMC 350 with a smaller footprint and lower power consumption.

The bus interfaces 356 and 358 communicate with the electronic system 360 and the PMU 370, respectively. Specifically, the bus interface 358 communicates with the PMU 370 over the communication bus 372. This allows the PMC 350 to control the operating states of the PMU 370. The communication bus 372 may include a serial bus or a parallel bus. The communication bus 372 may reside only on a single IC substrate that includes both the PMC 350 and the PMU 370. Alternatively, the communication bus 372 may communicatively couple different IC substrates on which the PMC 350 and the PMU 370 reside.

In some embodiments, the bus interface 356 allows the PMC 350 to communicate with the electronic system 360 via the communication bus 362. The communication bus 362 may include a serial bus or a parallel bus. This allows the electronic system 360 to control the operating parameters of the PMC 350, the operating states of the PMU 370, to change the PMA 355 stored in the programmable memory 354, etc.

Contrary to some conventional approach that involves power management software execution at the OS level of the PMC, the above approaches are more efficient in terms of extracting the maximum amount of power savings. This is because a processor in the conventional approach has to devote some processing overhead to executing the software, whereas the hardware-based approach above does not involve any processing overhead. Furthermore, executing power management software in a non-realtime OS may add more latency to the power management and thus, reducing the amount of power savings.

As discussed above, the PMA 355 may include a LEA, such as the exemplary embodiment illustrated in FIG. 4. Alternatively, the PMA 355 may include another algorithm, such as an algorithm for performing external dynamic voltage scaling (DVS) of a processor core. In general, the power consumption of a processor core is proportional to $NCfV^2$, where N is the number of switching gates, C is the capacitance of a gate, f is the frequency of gate switching, and V is the core voltage. Power consumption of the processor core may be reduced by scaling the frequency based on the workload of the processor core. Likewise, the core voltage can be scaled in relation to the frequency to further reduce power. A processor core typically includes complementary metal oxide semiconductor (CMOS) circuits. Due to the nature of CMOS circuits, as the switching frequency increases, the core voltage has to be increased also to ensure proper operation. Conversely, as the switching frequency decreases, the core voltage may be decreased. Note that when the switching frequency is increased, the voltage has to be increased in advance. Likewise, when the switching frequency is decreased, the voltage has to be decreased afterwards.

In some embodiments, the PMA including the DVS calculates the preferred processor core voltage using a combination of parameters, none of which require any involvement by the processor software at runtime. These parameters may include data preloaded at the time of manufacturing or at boot time, ambient temperature of the processor core and/or the electronic system, direct current (DC) and/or alternate current (AC) consumption of the processor core, the external reference frequency of the processor, DC and/or AC current consumption of the phase locked loop (PLL) or delay locked loop (DLL) circuitry of the processor, core voltage, etc. A PMC (such as PMC 300 in FIG. 3A) may include a programmable hardware state machine (such as the state machine 302 in FIG. 3A) for determining the preferred core voltage based on the measured parameters. In addition, a programmable memory (such as the programmable memory 354 in FIG. 3A) of the PMC may record parameter trends, previous states, adapting state machines, etc. In some embodiments, the PMC 350 is further capable of extracting information, such as clock frequency, processor load, etc., from the processor in the electronic system. Using the information extracted, the PMC executing the PMA may determine a more accurate core voltage for the processor.

Figure 5:
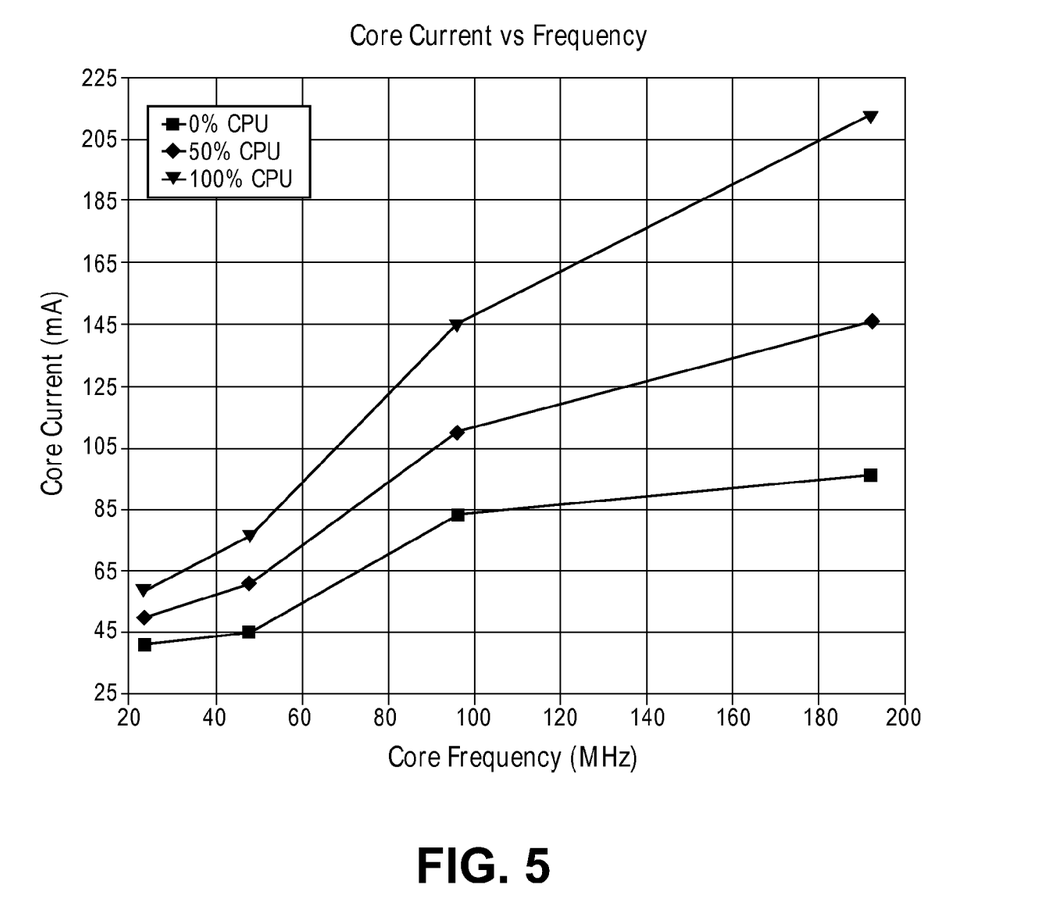
FIG. 5 shows an example of information that may be made available to the PMA executed within an exemplary PMC without requiring any action from the software executed on the processor.

FIG. 5 shows an example of information that may be made available to the PMA executed within the PMC 350 without requiring any action from the software executed on the processor. The graph in FIG. 5 plots the current consumption of the processor at a fixed core voltage for different core clock frequencies and different processor loads (also referred to as CPU loads). By measuring the core current consumption in conjunction with the core voltage and temperature, it may be possible for the PMA to estimate both the internal clock frequency of the processor core and the CPU load. Once the processor clock frequency is estimated, the PMA may calculate the optimal core voltage for the processor. In addition, by estimating the CPU load, the PMA may determine if the dynamic frequency scaling (DFS) circuitry and/or software inside the processor is likely to scale the internal clock frequency up or down. This may allow the PMA to predict an increase in the processor clock frequency and subsequently raise the core voltage preemptively so as to guarantee correct operation of the processor while DFS is implemented internally to the processor.

Figure 6:
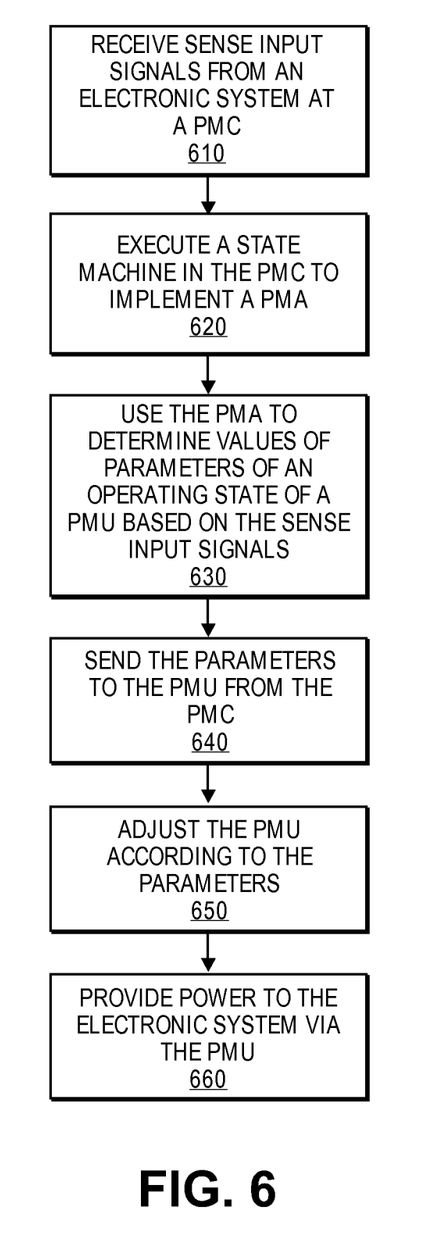
FIG. 6 illustrates one embodiment of a process to manage power using a power management algorithm.

FIG. 6 illustrates one embodiment of a process to manage power using a power management algorithm. The process may be performed by various embodiments of the PMC and PMU described above. In block 610, a PMC receives sense inputs signals from an electronic system. Then a state machine in the PMC is executed to implement a PMA in block 620. Some exemplary PMAs have been described above. Using the PMA, values of parameters of an operating state of a PMU is determined based on the sense input signals in block 630. Then the parameters are sent to the PMU from the PMC in block 640. In block 650, the PMU is adjusted according to the parameters. Finally, power is provided to the electronic system via the adjusted PMU at block 660.

Thus, a method and apparatus for on-demand power management has been described. It will be apparent from the foregoing description that aspects of the present invention may be embodied, at least in part, in software. That is, the techniques may be carried out in a computer system or other data processing system in response to its processor, such as processor 352, executing sequences of instructions contained in a memory, such as programmable memory 354. In various embodiments, hardwired circuitry may be used in combination with software instructions to implement the present invention. Thus, the techniques are not limited to any specific combination of hardware circuitry and software or to any particular source for the instructions executed by the data processing system. In addition, throughout this description, various functions and operations may be described as being performed by or caused by software code to simplify description. However, those skilled in the art will recognize what is meant by such expressions is that the functions result from execution of the code by a processor or controller, such as processor 352.

A computer readable medium can be used to store software and data which when executed by a data processing system causes the system to perform various methods of the present invention. This executable software and data may be stored in various places including, for example, programmable memory 354 in FIG. 3B or any other device that is capable of storing software programs and/or data.

Thus, a computer readable medium includes any mechanism that provides (i.e., stores and/or transmits) information in a form accessible by a machine (e.g., a computer, network device, personal digital assistant, manufacturing tool, any device with a set of one or more processors, etc.). For example, a computer readable medium includes recordable/non-recordable media (e.g., read only memory (ROM); random access memory (RAM); magnetic disk storage media; optical storage media; flash memory devices; etc.); etc.

It should be appreciated that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention. In addition, while the invention has been described in terms of several embodiments, those skilled in the art will recognize that the invention is not limited to the embodiments described. The embodiments of the invention can be practiced with modification and alteration within the scope of the appended claims. The specification and the drawings are thus to be regarded as illustrative instead of limiting on the invention.

What is claimed is:

1. An apparatus comprising: a power management unit (PMU) to provide power to an electronic system, wherein the PMU resides on a first integrated circuit (IC) substrate; and a power management controller (PMC) residing on a second IC substrate distinct from the first IC substrate, the PMC coupled to the PMU to control values of one or more parameters of an operating state of the PMU in response to operating conditions of the electronic system, wherein the PMC is configured to execute a power management algorithm (PMA) to determine values of the one or more parameters, wherein the PMC comprises: a state machine to implement the PMA and to receive sense input signals from the electronic system; a programmable memory coupled to the state machine to store operating parameters of the PMU; a first bus interface coupled to the state machine, to communicate with the electronic system; and a second bus interface coupled to the state machine, to communicate with the PMU, and a processor coupled to the programmable memory, to execute the instructions of the PMA and to receive the sense input signals from the electronic system.

2. The apparatus of claim 1, wherein the one or more parameters comprise at least one of a voltage, a frequency, or a control signal.

3. The apparatus of claim 1, wherein the PMA comprises a lower envelope algorithm.

4. The apparatus of claim 1, wherein the electronic system comprises a processor core and the PMA comprises external dynamic voltage scaling (DVS) of the processor core.

5. The apparatus of claim 1, wherein the PMU controls at least one power domain of the electronic system, the at least one power domain comprising a plurality of power states, wherein the PMC selects one of the plurality of power states based on the operating conditions of the electronic system according to the PMA and causes the PMU to enter into the selected one of the plurality of power states.

6. A system comprising the apparatus of claim 1, further comprising:
the electronic system, wherein the PMC is a separate from the electronic system; and
a communication bus coupled between the electronic system and the PMC.

7. A method comprising: providing power to an electronic system via a power management unit (PMU); and executing a power management algorithm (PMA) on a power management controller (PMC) to determine values of one or more parameters of an operating state of the PMU in response to operating conditions of the electronic system, wherein the PMC is a separate from the electronic system.

8. The method of claim 7, wherein executing the PMA on the PMC comprises:
receiving sense input signals from the electronic system at a state machine of the PMC; and
executing the state machine in response to the sense input signals to determine a power state of the PMU.

9. The method of claim 7, wherein the one or more parameters comprise at least one of a voltage, a frequency, or a control signal.

10. The method of claim 7, wherein the PMA comprises a lower envelope algorithm.

11. The method of claim 7, wherein the electronic system comprises a processor core and the PMA comprises external dynamic voltage scaling (DVS) of the processor core.

12. The method of claim 7, wherein providing power to the electronic system via the PMU comprises:
using the PMU to control at least one power domain of the electronic system, the at least one power domain comprising a plurality of power states.

13. The method of claim 12, further comprising:
using the PMC to select one of the plurality of power states for the PMU based on the operating conditions of the electronic system according to the PMA.

14. A non-transitory machine-readable medium that provides instructions that, when executed by a power management controller (PMC), will cause the PMC to perform operations comprising:
executing a power management algorithm (PMA) to determine values of one or more parameters of an operating state of a power management unit (PMU) in response to operating conditions of an electronic system, wherein the PMA implements dynamic voltage scaling of a processor core of the electronic system; and causing the PMU to enter into the operating state, wherein the PMU provides power to the electronic system, and receiving sense input signals from the electronic system at a processor of the PMC; the processor retrieving instructions of the PMA from a programmable memory of the PMC; and the processor executing the instructions of the PMA to determine a power state of the PMU based on the sense input signals.

15. The non-transitory machine-readable medium of claim 14, wherein the operations further comprise:
receiving sense input signals from the electronic system at a state machine of the PMC; and
executing the state machine in response to the sense input signals to determine a power state of the PMU.

16. The non-transitory machine-readable medium of claim 14, wherein the one or more parameters comprise at least one of a voltage, a frequency, or a control signal.

17. The non-transitory machine-readable medium of claim 14, wherein the PMA comprises a lower envelope algorithm.

18. The non-transitory machine-readable medium of claim 14, wherein the operations further comprise:
using the PMU to control at least one power domain of the electronic system, the at least one power domain comprising a plurality of power states.

19. The non-transitory machine-readable medium of claim 18, wherein the operations further comprise:
causing the PMC to select one of the plurality of power states for the PMU based on the operating conditions of the electronic system according to the PMA.

* * * * *